(12) United States Patent
van Egmond et al.

(10) Patent No.: US 7,404,891 B2
(45) Date of Patent: Jul. 29, 2008

(54) HEAT RECOVERY TECHNIQUE FOR CATALYST REGENERATOR FLUE GAS

(75) Inventors: Cor F. van Egmond, Pasadena, TX (US); James H. Beech, Jr., Kingwood, TX (US); Hans A. Klemm, Melrose, MA (US); Kyle Castaldy, Marlboro, MA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 746 days.

(21) Appl. No.: 10/812,142

(22) Filed: Mar. 29, 2004

(65) Prior Publication Data

US 2005/0238548 A1    Oct. 27, 2005

(51) Int. Cl.
*C10G 35/14* (2006.01)
*C10G 35/10* (2006.01)

(52) U.S. Cl. .................................................. 208/159
(58) Field of Classification Search .............. 208/159, 208/160; 422/146
See application file for complete search history.

(56) References Cited

U.S. PATENT DOCUMENTS

| | | | | |
|---|---|---|---|---|
| 2,391,327 A | | 12/1945 | Mekler ........................ 252/242 |
| 3,910,768 A | * | 10/1975 | Woebcke et al. ............. 208/130 |
| 4,107,226 A | | 8/1978 | Ennis, Jr. et al. ......... 260/683 R |
| 4,509,326 A | * | 4/1985 | Jorgensen ................. 60/39.182 |
| 4,556,479 A | | 12/1985 | Mauleon et al. ............. 208/164 |
| 4,956,509 A | | 9/1990 | Harandi et al. .............. 585/300 |
| 5,002,915 A | | 3/1991 | Harandi et al. ................ 502/51 |
| 5,043,517 A | * | 8/1991 | Haddad et al. .............. 585/533 |
| 5,114,682 A | | 5/1992 | Goelzer ....................... 422/142 |
| 5,503,821 A | | 4/1996 | McAlister et al. ........... 423/522 |
| 6,121,504 A | | 9/2000 | Kuechler et al. ............ 585/640 |
| 6,172,124 B1 | | 1/2001 | Wolflick et al. ............. 518/705 |
| 2002/0016522 A1 | * | 2/2002 | Vaughn et al. .............. 585/640 |

FOREIGN PATENT DOCUMENTS

| | | |
|---|---|---|
| DE | 3412482 | 10/1985 |
| EP | 0 426 400 | 5/1991 |
| JP | 357014685 | 1/1982 |
| JP | 358213087 | 12/1983 |
| WO | 94/27034 | 11/1994 |
| WO | 03/074175 | 9/2003 |

OTHER PUBLICATIONS

Abstract of Japanese Patent No. 358213087.
Abstract of Japanese Patent No. 357014685.
Abstract of German Patent No. 3412482.
David H. Linden, "Catalyst Deposits in FCCU Power Recovery Systems Can be Controlled", Oil & Gas Journal, Pennwell Publishing Co. Tulsa, US, vol. 84, No. 50, Dec. 15, 1986, pp. 33-38.
Lugand P., et al, "Advantages of Steam-Gas Combined Cycle Power Plants", Alsthom Review, Alsthom, Paris, FR, No. 13, Jun. 1, 1989, pp. 3-18.

* cited by examiner

*Primary Examiner*—Glenn Caldarola
*Assistant Examiner*—Randy Boyer (57) ABSTRACT

A technique for recovering heat from a high temperature effluent stream from catalyst regeneration or the like, comprising processes and means for: (a) passing the effluent stream in heat exchange relationship in a steam generator with boiler feed water to produce high pressure steam and partially cool the effluent stream; (b) passing the partially cooled effluent stream from the steam regenerator in heat exchange relationship to preheat high pressure boiler feed water and further cool the effluent stream; and (c) passing the preheated boiler feed water to the steam generator. The apparatus and processes for thermal energy recovery may be used to treat hot regenerator effluent from FCC or OTO-type processes, thereby producing a cooled flue gas stream to discharge to ambient atmosphere.

35 Claims, 4 Drawing Sheets

HEAT RECOVERY TECHNIQUE FOR CATALYST REGENERATOR FLUE GAS

FIELD OF THE INVENTION

The present invention relates to treatment of hot effluent streams from catalyst regenerator unit operations, such as those utilized in fluidized catalytic cracking (FCC) processes, oxygenate-to-olefin processes, etc.

BACKGROUND OF THE INVENTION

Olefins are traditionally produced from petroleum feedstocks by catalytic or steam cracking processes. These cracking processes, especially steam cracking, produce light olefin(s), such as ethylene and/or propylene, from a variety of hydrocarbon feedstocks. Ethylene and propylene are important commodity petrochemicals useful in a variety of processes for making plastics and other chemical compounds.

The petrochemical industry has known for some time that oxygenates, especially alcohols, are convertible into light olefin(s). There are numerous technologies available for producing oxygenates including fermentation or reaction of synthesis gas derived from natural gas, petroleum liquids or carbonaceous materials including coal, recycled plastics, municipal waste or any other organic material. Generally, the production of synthesis gas involves a combustion reaction of natural gas, mostly methane, and an oxygen source into hydrogen, carbon monoxide and/or carbon dioxide. Other known syngas production processes include conventional steam reforming, autothermal reforming, or a combination thereof.

An alternate feed for the production of light olefins includes oxygenates, such as, for example, alcohols, particularly methanol and ethanol, dimethyl ether (DME), methyl ethyl ether, diethyl ether, dimethyl carbonate, and methyl formate. This conversion process is typically referred to as an oxygenate to olefins (OTO) reaction process. Many of these oxygenates may be produced by fermentation, or from synthesis gas derived from natural gas, petroleum liquids, carbonaceous materials, including coal, recycled plastics, municipal wastes, or any organic material. Because of the wide variety of sources, alcohol, alcohol derivatives, and other oxygenates have promise as an economical, non-petroleum source for light olefin production.

When methanol is the oxygenate, the conversion process is typically referred to as a methanol to olefins (MTO) reaction process. Methanol is typically synthesized from the catalytic reaction of hydrogen, carbon monoxide and/or carbon dioxide in a methanol reactor in the presence of a heterogeneous catalyst. For example, in one synthesis process, methanol is produced using a copper/zinc oxide catalyst in a water-cooled tubular methanol reactor. The preferred process for converting a feedstock containing methanol into one or more olefin(s), primarily ethylene and/or propylene, involves contacting the feedstock with a catalyst composition.

The catalysts used to promote the conversion of oxygenates to olefins are molecular sieve catalysts. Because ethylene and propylene are the most sought after products of such a reaction, research has focused on what catalysts are most selective to ethylene and/or propylene, and on methods for increasing the life and selectivity of the catalysts to ethylene and/or propylene.

Catalytic processes utilizing fluidized bed technology for conversion of hydrocarbon or oxygenates involving gas-solids contacting are widely used in industry for productions of petroleum-based fuels, chemical feed stocks and other industrial materials. The gaseous reactants are contacted with solid catalyst particles to provide gaseous products. Such processes often use continuous catalytic reactor unit operations, requiring catalyst regeneration at high temperature. FCC, OTO and other processes usually employ oxidative regeneration to remove coke or other carbonaceous deposits from spent or equilibrium catalysts. These operations often utilize combustion air to burn carbonaceous matter deposited on the catalyst during the conversion reactions. Ordinarily, this regeneration is carried out in a regeneration vessel separate from the main fluidized bed reactor. Attrition of the catalyst particles can occur during circulation of the catalyst into smaller particles of, less than about 100 microns, say, less than about 60 microns, in overall diameter, i.e., the largest particle dimension.

The waste flue gas or high temperature effluent from catalyst regeneration can be treated to remove entrained particles, such as catalyst fines carried from the process. Such removal is desirable inasmuch as these particles can cause erosion and plugging problems for downstream equipment, e.g., compressors, pumps, valves, exchangers and piping. Ultimately, the particles may be vented with gases to ambient atmosphere for disposal, e.g., through a cyclone used to separate solids from gases. Thus-disposed waste gases can have recoverable thermal value or environmentally objectionable properties resulting from particulate content, which renders such gases susceptible to further treatment. Accordingly, it would be desirable to provide a process, which ultimately recovers thermal value to the process from such high temperature effluent from catalyst regeneration.

U.S. Pat. No. 2,391,327 to Mekler teaches catalyst regeneration wherein flue gases from a regeneration zone are directed to a heat exchange unit such as a waste-heat boiler, steam superheater, hot gas turbine or the like.

U.S. Pat. No. 3,910,768 to Woebcke et al. relates to a high pressure cracking furnace whose flue gas is used to produce high pressure steam, cool cracked gas, preheat feed and drive a turbine.

U.S. Pat. No. 4,556,479 to Mauleon et al. and U.S. Pat. No. 5,002,915 to Harandi et al. disclose indirect cooling of catalyst regenerator flue gas with steam generation.

U.S. Pat. No. 4,956,509 to Harandi et al. discloses catalytic cracking of hydrocarbons wherein hot flue gas from a catalyst regenerator flows through a heat exchanger and is reduced from 650° to 510° C. (1200° to 950° F.) and is thence passed to a downstream heat recovery system, which may include steam generation, and reduced to 190° C. (375° F.) before release to the atmosphere.

U.S. Pat. No. 5,043,517 to Haddad et al. discloses two-stage heating of boiler feed water with hot reactor effluent.

U.S. Pat. No. 6,121,504 to Kuechler et al. discloses a process for converting oxygenates to olefins with direct product quenching for heat recovery and to improve heat integration.

All of the above references are incorporated herein by reference in their entirety.

SUMMARY OF THE INVENTION

In one aspect, the invention resides in a process for recovering heat from a high temperature effluent stream, such as flue gas from catalyst regeneration, or the like. This comprises the steps of: (a) passing the effluent stream through a heat exchanger associated with a steam generator fed with boiler feed water to produce high pressure steam and partially cool the effluent stream; (b) passing the partially cooled effluent stream through a heat exchanger associated with a high pressure boiler feed water preheater to provide preheated boiler feed water and further cool the effluent stream; and (c) passing the preheated boiler feed water to the steam generator.

In one embodiment of the present invention, the high temperature effluent stream has a temperature of at least about 650° C. (at least about 1200° F.), say, a temperature ranging from about 650° to about 730° C. (from about 1200° to about 1350° F.), e.g., a temperature ranging from about 652° to about 691° C. (from about 1205° to about 1275° F.), the partially cooled effluent stream has a temperature not greater than about 262° C. (not greater than about 500° F.), optionally a temperature ranging from about 232° to about 343° C. (from about 450° to about 650° F), e.g., a temperature ranging from about 260° to about 316° C. (from about 500° to about 600° F.), and the further cooled effluent stream has a temperature not greater than about 127° C. (not greater than about 260° F.), optionally a temperature ranging from about 116° to about 204° C. (from about 240° to about 400° F.), e.g., a temperature ranging from about 127° to about 160° C. (from about 260° to about 320° F.).

In another embodiment of the present invention, the preheated boiler feed water has a pressure of at least about 4240 kpaa (at least about 600 psig), say, a pressure ranging from about 4240 to about 7688 kPaa (from about 600 to about 1100 psig), e.g., a pressure ranging from about 4240 to about 6309 kpaa (from about 600 to about 900 psig), and a temperature of at least about 150° C. (302° F.), say, ranging from about 150° to about 293 ° C. (from about 302° to about 560° F.), e.g., ranging from about 150° to about 277° C. (from about 302° to about 530° F.).

In still another embodiment, the further cooled effluent stream contains catalyst fines and is passed from step (b) to a catalyst fines removal unit for removal of the catalyst fines. In order to remove the catalyst fines contained in the further cooled effluent stream, the further cooled effluent stream optionally is passed from step (b) to the catalyst fines removal unit, which preferably is selected from the group consisting of: an electrostatic precipitator, a wet electrostatic precipitator, a third stage separator (e.g., a cyclone separator or other inertial separation device), a filter, a baghouse and a wet gas scrubber. The further cooled effluent stream can be passed from the catalyst fines removal unit to a flue gas stack for disposal in ambient atmosphere.

In yet another embodiment, the preheated boiler feed water and the high pressure steam from the steam generator are mixed in a steam drum and liquid boiler feed water is passed from the steam drum to the steam generator. High pressure steam can be taken from the steam drum.

In yet another embodiment, the high temperature effluent stream is taken from a catalyst regenerator of a fluidized catalytic cracker.

In an alternate embodiment, the high temperature effluent stream is taken from a catalyst regenerator associated with an oxygenate to olefins reactor, e.g., a methanol to olefins reactor. Such a reactor can employ a catalyst which comprises SAPO-34.

In another embodiment, the steam generator and the preheater are located within a common enclosure.

In another aspect, the present invention relates to an apparatus for recovering heat from a catalytic reactor system, comprising: a catalyst regenerator having an outlet for hot flue gas; a steam generator comprising a first indirect heat exchanger operatively connected to receive hot flue gas from the catalyst regenerator and a supply of high pressure liquid boiler feed water; a boiler feed water preheater comprising a second indirect heat exchanger connected to receive the boiler feed water and operatively connected to receive partially cooled flue gas from the steam generator; conduit means for passing preheated high pressure boiler feed water from the preheater to the steam generator; and means for recovering high pressure steam from the steam generator.

In one embodiment of this aspect of the invention, the apparatus further comprises a steam drum operatively connected to receive the preheated boiler feed water and high pressure steam for mixing in the steam drum, and conduit means for passing liquid boiler feed water from the steam drum to the steam generator. The apparatus can further comprise a conduit means for passing high pressure steam from the steam drum.

In yet another aspect, the present invention relates to a process for catalytic conversion using a molecular sieve catalyst which accumulates carbonaceous deposit during operation of a catalytic reactor, wherein the carbonaceous deposit is removed in a high temperature regenerator unit with a regeneration medium, which comprises the steps of: passing a high temperature effluent stream containing catalyst fines from the regenerator unit to a heat exchanger associated with a steam generator fed with boiler feed water, to produce high pressure steam and a partially cooled effluent stream; passing the partially cooled effluent stream to a heat exchanger associated with a high pressure boiler feed water preheater to further cool the effluent stream; and further treating the effluent stream to remove the catalyst fines.

In still another aspect, the present invention relates to a process for catalytic conversion using a molecular sieve catalyst which accumulates carbonaceous deposit during operation of a catalytic reactor, wherein the carbonaceous deposit is removed in a high temperature regenerator unit with a regeneration medium, which comprises the steps of: passing a high temperature effluent stream from the regenerator unit to a heat exchanger associated with a steam generator fed with boiler feed water, to produce high pressure steam and a partially cooled effluent stream; passing the partially cooled effluent stream to a heat exchanger associated with a high pressure boiler feed water preheater to provide preheated boiler feed water and further cooled effluent stream; passing the preheated boiler feed water and the high pressure steam from the steam generator to a steam drum for direct contact and mixing; recovering high pressure steam from the steam drum; and passing liquid boiler feed water from the steam drum to the steam generator, thereby providing efficient recovery of thermal value.

In one embodiment, the partially cooled effluent stream has been cooled to no less than about 249° C. (480° F.), say, no less than about 277° C. (530° F.), e.g., no less than about 293° C. (560° F.), and the further cooled effluent stream has been cooled to at least about 138° C. (280° F.) say, at least about 166° C. (330° F.), e.g., at least about 182° C. (360° F.). Ideally, the further cooled effluent stream has been cooled to at least 25° C. less than the partially cooled effluent stream temperature. The further cooling of the effluent protects downstream equipment and can increase steam make.

In one embodiment of this aspect of the present invention, the furthers cooled effluent stream contains catalyst fines and is passed to a catalyst fines removal unit for removal of the catalyst fines. The catalyst fines comprise particles whose largest particle dimension is less than about 100 microns, say, less than about 60 microns.

In a typical heat recovery system according to the present invention, a cooled effluent stream contains catalyst fines and is passed from a heat exchange means to a catalyst fines removal unit for removal of the catalyst fines; and the resulting cool, clean effluent stream is passed from the catalyst fines removal unit to a flue gas stack for disposal into ambient atmosphere.

BRIEF DESCRIPTION OF THE DRAWINGS

The present invention will be better understood in view of the non-limiting figures, wherein.

DETAILED DESCRIPTION OF THE INVENTION

Molecular Sieves and Catalysts Thereof for Use in OTO Conversion

Molecular sieves suited to use for converting oxygenates to olefins (OTO) have various chemical and physical, framework, characteristics. Molecular sieves have been well classified by the Structure Commission of the International Zeolite Association according to the rules of the IUPAC Commission on Zeolite Nomenclature. A framework-type describes the connectivity, topology, of the tetrahedrally coordinated atoms constituting the framework, and making an abstraction of the specific properties for those materials. Framework-type zeolite and zeolite-type molecular sieves for which a structure has been established, are assigned a three letter code and are described in the Atlas of Zeolite Framework Types, 5th edition, Elsevier, London, England (2001), which is herein fully incorporated by reference.

Non-limiting examples of these molecular sieves are the small pore molecular sieves of a framework-type selected from the group consisting of AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves of a framework-type selected from the group consisting of AFO, AEL, EUO, HEU, FER, MEL, MFI, MTW, MTT, TON, and substituted forms thereof; and the large pore molecular sieves of a framework-type selected from the group consisting of EMT, FAU, and substituted forms thereof. Other molecular sieves have a framework-type selected from the group consisting of ANA, BEA, CFI, CLO, DON, GIS, LTL, MER, MOR, MWW and SOD. Non-limiting examples of the preferred molecular sieves, particularly for converting an oxygenate containing feedstock into olefin(s), include those having a framework-type selected from the group consisting of AEL, AFY, BEA, CHA, EDI, FAU, FER, GIS, LTA, LTL, MER, MFI, MOR, MTT, MWW, TAM and TON. In one preferred embodiment, the molecular sieve of the invention has an AEI topology or a CHA topology, or a combination thereof, most preferably a CHA topology.

Molecular sieve materials all have 3-dimensional, four-connected framework structure of coner-sharing TO4 tetrahedra, where T is any tetrahedrally coordinated cation. These molecular sieves are typically described in terms of the size of the ring that defines a pore, where the size is based on the number of T atoms in the ring. Other framework-type characteristics include the arrangement of rings that form a cage, and when present, the dimension of channels, and the spaces between the cages. See van Bekkum, et al., Introduction to Zeolite Science and Practice, Second Completely Revised and Expanded Edition, Volume 137, pages 1-67, Elsevier Science, B.V., Amsterdam, Netherlands (2001).

The small, medium and large pore molecular sieves have from a 4-ring to a 12-ring or greater framework-type. In a preferred embodiment, the zeolitic molecular sieves have 8-, 10- or 12-ring structures or larger and an average pore size in the range of from about 3 Å to 15 Å. In the most preferred embodiment, the molecular sieves utilized in the invention, preferably silicoaluminophosphate molecular sieves have 8-rings and an average pore size less than about 5 Å, preferably in the range of from 3 Å to about 5 Å, more preferably from 3 Å to about 4.5 Å, and most preferably from 3.5 Å to about 4.2 Å.

Molecular sieves, particularly zeolitic and zeolitic-type molecular sieves, preferably have a molecular framework of one, preferably two or more coner-sharing $[TO_4]$ tetrahedral units, more preferably, two or more $[SiO_4]$, $[AlO_4]$ and/or $[PO_4]$ tetrahedral units, and most preferably $[SiO_4]$, $[AlO_4]$ and $[PO_4]$ tetrahedral units. These silicon, aluminum, and phosphorous based molecular sieves and metal containing silicon, aluminum and phosphorous based molecular sieves have been described in detail in numerous publications including for example, U.S. Pat. No. 4,567,029 (MeAPO where Me is Mg, Mn, Zn, or Co), U.S. Pat. No. 4,440,871 (SAPO), European Patent Application EP-A-0 159 624 (ELAPSO where El is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683,217, 4,744,885 (FeAPSO), EP-A-0 158 975 and U.S. Pat. No. 4,935,216 (ZNAPSO, EP-A-0 161 489 (CoAPSO), EP-A-0 158 976 (ELAPO, where EL is Co, Fe, Mg, Mn, Ti or Zn), U.S. Pat. No. 4,310,440 (AlPO4), EP-A-0 158 350 (SENAPSO), U.S. Pat. No. 4,973,460 (LiAPSO), U.S. Pat. No. 4,789,535 (LiAPO), U.S. Pat. No. 4,992,250 (GeAPSO), U.S. Pat. No. 4,888,167 (GeAPO), U.S. Pat. No. 5,057,295 (BAPSO), U.S. Pat. No. 4,738,837 (CrAPSO), U.S. Pat. Nos. 4,759,919, and 4,851,106 (CrAPO), U.S. Pat. Nos. 4,758,419, 4,882,038, 5,434,326 and 5,478,787 (MgAPSO), U.S. Pat. No. 4,554,143 (FeAPO), U.S. Pat. No. 4,894,213 (AsAPSO), U.S. Pat. No. 4,913,888 (AsAPO), U.S. Pat. Nos. 4,686,092, 4,846,956 and 4,793,833 (MnAPSO), U.S. Pat. Nos. 5,345,011 and 6,156,931 (MnAPO), U.S. Pat. No. 4,737,353 (BeAPSO), U.S. Pat. No. 4,940,570 (BeAPO), U.S. Pat. Nos. 4,801,309, 4,684,617 and 4,880,520 (TiAPSO), U.S. Pat. Nos. 4,500,651, 4,551,236 and 4,605,492 (TiAPO), U.S. Pat. Nos. 4,824,554, 4,744,970 (CoAPSO), U.S. Pat. No. 4,735,806 (GaAPSO) EP-A-0 293 937 (QAPSO, where Q is framework oxide unit $[QO_2]$), as well as U.S. Pat. Nos. 4,567,029, 4,686,093, 4,781,814, 4,793,984, 4,801,364, 4,853,197, 4,917,876, 4,952,384, 4,956,164, 4,956,165, 4,973,785, 5,241,093, 5,493,066 and 5,675,050, all of which are herein fully incorporated by reference.

Other molecular sieves include those described in EP-0 888 187 B1 (microporous crystalline metallophosphates, SAPO-4 (UIO-6)), U.S. Pat. No. 6,004,898 (molecular sieve and an alkaline earth metal), U.S. patent application Ser. No. 09/511,943 filed Feb. 24, 2000 (integrated hydrocarbon co-catalyst), PCT WO 01/64340 published Sep. 7, 2001(thorium containing molecular sieve), and R. Szostak, Handbook of Molecular Sieves, Van Nostrand Reinhold, New York, N.Y. (1992), which are all herein fully incorporated by reference.

The more preferred silicon, aluminum and/or phosphorous containing molecular sieves, and aluminum, phosphorous, and optionally silicon, containing molecular sieves include aluminophosphate (ALPO) molecular sieves and silicoaluminophosphate (SAPO) molecular sieves and substituted, preferably metal substituted, ALPO and SAPO molecular sieves. The most preferred molecular sieves are SAPO molecular sieves, and metal substituted SAPO molecular sieves. In an embodiment, the metal is an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIB, VIIB, VIIIB, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof. In another preferred embodiment, these metal atoms discussed above are inserted into the framework of a molecular sieve through a tetrahedral unit, such as [$MeO_2$], and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the molecular sieve, as described in many of the U.S. Patents mentioned above, is represented by the empirical formula, on an anhydrous basis:

$$mR:(M_xAl_yP_z)O_2$$

wherein R represents at least one templating agent, preferably an organic templating agent; m is the number of moles of R per mole of $(M_xAl_yP_z)O_2$ and m has a value from 0 to 1, preferably 0 to 0.5, and most preferably from 0 to 0.3; x, y, and z represent the mole fraction of Al, P and M as tetrahedral oxides, where M is a metal selected from one of Group IA, IIA, IB, IIIB, IVB, VB, VIB, VIIB, VIIIB and Lanthanide's of the Periodic Table of Elements, preferably M is selected from one of the group consisting of Co, Cr, Cu, Fe, Ga, Ge, Mg, Mn, Ni, Sn, Ti, Zn and Zr. In an embodiment, m is greater than or equal to 0.2, and x, y and z are greater than or equal to 0.01.

In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Non-limiting examples of SAPO and ALPO molecular sieves of the invention include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44 (U.S. Pat. No. 6,162,415), SAPO-47, SAPO-56, ALPO-5, ALPO-11, ALPO-18, ALPO-31, ALPO-34, ALPO-36, ALPO-37, ALPO-46, and metal containing molecular sieves thereof. The more preferred zeolite-type molecular sieves include one or a combination of SAPO-18, SAPO-34, SAPO-35, SAPO-44, SAPO-56, ALPO-18 and ALPO-34, even more preferably one or a combination of SAPO-18, SAPO-34, ALPO-34 and ALPO-18, and metal containing molecular sieves thereof, and most preferably one or a combination of SAPO-34 and ALPO-18, and metal containing molecular sieves thereof.

In an embodiment, the molecular sieve is an intergrowth material having two or more distinct phases of crystalline structures within one molecular sieve composition. In particular, intergrowth molecular sieves are described in the U.S. patent application Ser. No. 09/924,016 filed Aug. 7, 2001 and PCT WO 98/15496 published Apr. 16, 1998, both of which are herein fully incorporated by reference. In another embodiment, the molecular sieve comprises at least one intergrown phase of AEI and CHA framework-types. For example, SAPO-18, ALPO-18 and RUW-18 have an AEI framework-type, and SAPO-34 has a CHA framework-type.

The molecular sieves useful for oxygenates to olefins conversion processes are synthesized and then made or formulated into catalysts by combining the synthesized molecular sieves with a binder and/or a matrix material to form a molecular sieve catalyst composition. This molecular sieve catalyst composition is formed into useful shaped and sized particles by well-known techniques such as spray drying, pelletizing, extrusion, and the like.

Oxygenate to Olefin Reaction Processes

In a preferred embodiment of an oxygenate to olefins (OTO) process, the feedstock contains one or more oxygenates, more specifically, one or more organic compound(s) containing at least one oxygen atom. In the most preferred embodiment, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in an oxygenate to olefins process include lower straight and branched chain aliphatic alcohols and their unsaturated counterparts.

Non-limiting examples of suitable oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof.

In the most preferred embodiment, the feedstock is selected from one or more of methanol, ethanol, dimethyl ether, diethyl ether or a combination thereof, more preferably methanol and dimethyl ether, and most preferably methanol.

The various feedstocks discussed above, particularly a feedstock containing an oxygenate, more particularly a feedstock containing an alcohol, is converted primarily into one or more olefin(s). The olefin(s) or olefin monomer(s) produced from the feedstock typically have from 2 to 30 carbon atoms, preferably 2 to 8 carbon atoms, more preferably 2 to 6 carbon atoms, still more preferably 2 to 4 carbons atoms, and most preferably ethylene and/or propylene.

Non-limiting examples of olefin monomer(s) include ethylene, propylene, butene-1, pentene-1,4-methyl-pentene-1, hexene-1, octene-1 and decene-1, preferably ethylene, propylene, butene-1, pentene-1,4-methyl-pentene-1, hexene-1, octene-1 and isomers thereof. Other olefin monomer(s) include unsaturated monomers, diolefins having 4 to 18 carbon atoms, conjugated or nonconjugated dienes, polyenes, vinyl monomers and cyclic olefins.

In the most preferred embodiment, the feedstock, preferably of one or more oxygenates, is converted in the presence of a molecular sieve catalyst composition into olefin(s) having 2 to 6 carbons atoms, preferably 2 to 4 carbon atoms. Most preferably, the olefin(s), alone or in combination, are converted from a feedstock containing an oxygenate, preferably an alcohol, most preferably methanol, to the preferred olefin(s) ethylene and/or propylene.

There are many processes used to convert feedstock into olefin(s) including various cracking processes such as steam cracking, thermal regenerative cracking, fluidized bed cracking, fluid catalytic cracking, deep catalytic cracking, and visbreaking.

The most preferred process is generally referred to as methanol-to-olefins (MTO). In a MTO process, typically an oxygenated feedstock, most preferably a methanol containing feedstock, is converted in the presence of a molecular sieve catalyst composition into one or more olefin(s), preferably and predominantly, ethylene and/or propylene, often referred to as light olefin(s).

In one embodiment of the process for conversion of a feedstock, preferably a feedstock containing one or more oxygenates, the amount of olefin(s) produced based on the total weight of hydrocarbon produced is greater than 50 weight percent, preferably greater than 60 weight percent, more preferably greater than 70 weight percent, and most preferably greater than 85 weight percent.

Increasing the selectivity of preferred hydrocarbon products such as ethylene and/or propylene from the conversion of an oxygenate using a molecular sieve catalyst composition is described in U.S. Pat. No. 6,137,022 (linear velocity), and PCT WO 00/74848 published Dec. 14, 2000 (methanol uptake index of at least 0.13), which are all herein fully incorporated by reference.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, for example water, is used either in a liquid or a vapor form, or a combination thereof. The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In one embodiment, other hydrocarbons are added to a feedstock either directly or indirectly, and include olefin(s), paraffin(s), aromatic(s) (see, for example, U.S. Pat. No. 4,677,242, addition of aromatics) or mixtures thereof, preferably propylene, butylene, pentylene, and other hydrocarbons having 4 or more carbon atoms, or mixtures thereof.

The process for converting a feedstock, especially a feedstock containing one or more oxygenates, in the presence of a molecular sieve catalyst composition, is carried out in a reaction process in a reactor, where the process is a fixed bed process, a fluidized bed process, preferably a continuous fluidized bed process, and most preferably a continuous high velocity fluidized bed process.

The reaction processes can take place in a variety of catalytic reactors such as hybrid reactors that have a dense bed or fixed bed zones and/or fast fluidized bed reaction zones coupled together, circulating fluidized bed reactors, riser reactors, and the like. Suitable conventional reactor types are described in, for example, U.S. Pat. Nos. 4,076,796, 6,287,522 (dual riser), and Fluidization Engineering, D. Kunii and O. Levenspiel, Robert E. Krieger Publishing Company, New York, N.Y. 1977, which are all herein fully incorporated by reference.

The preferred reactor types are riser reactors generally described in Riser Reactor, Fluidization and Fluid-Particle Systems, pages 48 to 59, F. A. Zenz and D. F. Othmer, Reinhold Publishing Corporation, New York, 1960, and U.S. Pat. Ser. No. 6,166,282 (fast-fluidized bed reactor), and U.S. patent application Ser. No. 09/564,613, filed May 4, 2000 (multiple riser reactor), which are all herein fully incorporated by reference.

In a preferred embodiment, a fluidized bed process or high velocity fluidized bed process includes a reactor system, a regeneration system and a recovery system.

The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a zeolite or zeolite-type molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen.

In an embodiment, the amount of liquid feedstock, which is processed by the present invention to provide liquids of reduced at least partial non-volatiles impurities, is fed separately or jointly with a vapor feedstock, to a reactor system in the range of from about 0 weight percent to about 85 weight percent, preferably from about 1 weight percent to about 75 weight percent, more preferably from about 5 weight percent to about 65 weight percent, say, from about 0 weight percent to about 10 weight percent, based on the total weight of the feedstock including any diluent contained therein. The liquid and vapor feedstocks are preferably of similar composition, or contain varying proportions of the same or different feedstock with the same or different diluent.

Treatment of the oxygenate-containing feedstock prior to its introduction to the oxygenate to olefins conversion reactor may be required to remove non-volatile contaminants.

The feedstock entering the reactor system is preferably converted, partially or fully, in the first reactor zone into a gaseous effluent that enters the disengaging vessel along with a coked molecular sieve catalyst composition. In the preferred embodiment, cyclone(s) within the disengaging vessel are designed to separate the molecular sieve catalyst composition, preferably a coked molecular sieve catalyst composition, from the gaseous effluent containing one or more olefin(s) within the disengaging zone. Cyclones are preferred, however, gravity effects within the disengaging vessel will also separate the catalyst compositions from the gaseous effluent. Other processes for separating the catalyst compositions from the gaseous effluent include the use of plates, caps, elbows, and the like.

In one embodiment of the disengaging system, the disengaging system includes a disengaging vessel, typically a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel and the gas is passed at a gas hourly superficial velocity (GHSV) of from 1 $hr^{-1}$ to about 20,000 $hr^{-1}$ based on the volume of gas to volume of coked molecular sieve catalyst composition, preferably at an elevated temperature from 250° C. to about 750°

C., preferably from about 350° C. to 650° C., over the coked molecular sieve catalyst composition.

The conversion temperature employed in the conversion process, specifically within the reactor system, is in the range of from about 200° C. to about 1000° C., preferably from about 250° C. to about 800° C., more preferably from about 250° C. to about 750° C., yet more preferably from about 300° C. to about 650° C., yet even more preferably from about 350° C. to about 600° C. most preferably from about 350° C. to about 550° C.

The conversion pressure employed in the conversion process, specifically within the reactor system, varies over a wide range including autogenous pressure. The conversion pressure is based on the partial pressure of the feedstock exclusive of any diluent therein. Typically the conversion pressure employed in the process is in the range of from about 0.1 kpaa to about 5 MPaa, preferably from about 5 kpaa to about 1 MPaa, and most preferably from about 20 kPaa to about 500 kPaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone. The WHSV is maintained at a level sufficient to keep the catalyst composition in a fluidized state within a reactor.

Typically, the WHSV ranges from about 1 $hr^{-1}$ to about 5000 $hr^{-1}$, preferably from about 2 $hr^{-1}$ to about 3000 $hr^{-1}$, more preferably from about 5 $hr^{-1}$ to about 1500 $hr^{-1}$, and most preferably from about 10 $hr^{-1}$ to about 1000 $hr^{-1}$. In one preferred embodiment, the WHSV is greater than 20 $hr^{-1}$, preferably the WHSV for conversion of a feedstock containing methanol and dimethyl ether is in the range of from about 20 $hr^{-1}$ to about 300 $hr^{-1}$.

The superficial gas velocity (SGV) of the feedstock including diluent and reaction products within the reactor system is preferably sufficient to fluidize the molecular sieve catalyst composition within a reaction zone in the reactor. The SGV in the process, particularly within the reactor system, more particularly within the riser reactor(s), is at least 0.1 meter per second (m/sec), preferably greater than 0.5 m/sec, more preferably greater than 1 m/sec, even more preferably greater than 2 m/sec, yet even more preferably greater than 3 m/sec, and most preferably greater than 4 m/sec, e.g., greater than about 15 m/sec. See, for example, U.S. patent application Ser. No. 09/708,753, filed Nov. 8, 2000, the entirety of which is incorporated herein by reference.

In one preferred embodiment of the process for converting an oxygenate to olefin(s) using a silicoaluminophosphate molecular sieve catalyst composition, the process is operated at a WHSV of at least 20 hr-1 and a Temperature Corrected Normalized Methane Selectivity (TCNMS) of less than 0.016, preferably less than or equal to 0.01. See, for example, U.S. Pat. No. 5,952,538, which is herein fully incorporated by reference.

In another embodiment of the process for converting an oxygenate such as methanol to one or more olefin(s) using a molecular sieve catalyst composition, the WHSV is from 0.01 $hr^{-1}$ to about 100 $hr^{-1}$, at a temperature of from about 350° C. to 550° C., and silica to $Me_2O_3$ (Me is selected from Group 13 (IIIA), Groups 8, 9 and 10 (VIII) elements) from the Periodic Table of Elements), and a molar ratio of from 300 to 2500. See, for example, EP-0 642 485 B1, which is herein fully incorporated by reference.

Other processes for converting an oxygenate such as methanol to one or more olefin(s) using a molecular sieve catalyst composition are described in PCT WO 01/23500 published Apr. 5, 2001 (propane reduction at an average catalyst feedstock exposure of at least 1.0), which is herein incorporated by reference.

The coked molecular sieve catalyst composition is withdrawn from the disengaging vessel, preferably by one or more cyclones(s), and introduced to the regeneration system. The regeneration system comprises a regenerator where the coked catalyst composition is contacted with a regeneration medium, preferably a gas containing oxygen, under general regeneration conditions of temperature, pressure and residence time.

Non-limiting examples of the regeneration medium include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. The regeneration conditions are those capable of burning coke from the coked catalyst composition, preferably to a level less than 0.5 weight percent based on the total weight of the coked molecular sieve catalyst composition entering the regeneration system. The coked molecular sieve catalyst composition withdrawn from the regenerator forms a regenerated molecular sieve catalyst composition.

The regeneration temperature is in the range of from about 200° C. to about 1500° C., preferably from about 300° C. to about 1000° C., more preferably from about 450° C. to about 750° C., and most preferably from about 550° C. to 700° C. The regeneration is in the range of from about 10 psia (68 kpaa) to about 500 psia (3448 kpaa), preferably from about 15 psia (103 kpaa) to about 250 psia (1724 kpaa), and more preferably from about 20 psia (138 kpaa) to about 150 psia (1034 kpaa). Typically, the pressure is less than about 60 psia (414 kpaa).

The preferred residence time of the molecular sieve catalyst composition in the regenerator is in the range of from about one minute to several hours, most preferably about one minute to 100 minutes, and the preferred volume of oxygen in the flue gas is in the range of from about 0.01 mole percent to about 5 mole percent based on the total volume of the gas.

In one embodiment, regeneration promoters, typically metal containing compounds such as platinum, palladium and the like, are added to the regenerator directly, or indirectly, for example with the coked catalyst composition. Also, in another embodiment, a fresh molecular sieve catalyst composition is added to the regenerator containing a regeneration medium of oxygen and water as described in U.S. Pat. No. 6,245,703, which is herein fully incorporated by reference.

In an embodiment, a portion of the coked molecular sieve catalyst composition from the regenerator is returned directly to the one or more riser reactor(s), or indirectly, by pre-contacting with the feedstock, or contacting with fresh molecular sieve catalyst composition, or contacting with a regenerated molecular sieve catalyst composition or a cooled regenerated molecular sieve catalyst composition described below.

The gaseous effluent from the OTO reactor is withdrawn from the disengaging system and is passed through a recovery system. There are many well-known recovery systems, techniques and sequences that are useful in separating olefin(s) and purifying olefin(s) from the gaseous effluent. Recovery systems generally comprise one or more or a combination of various separation, fractionation and/or distillation towers, columns, splitters, or trains, for reaction systems such as ethylbenzene manufacture (U.S. Pat. No. 5,476,978) and other derivative processes such as aldehydes, ketones and ester manufacture (U.S. Pat. No. 5,675,041), and other associated equipment for example various condensers, heat exchangers, refrigeration systems or chill trains, compressors, knock-out drums or pots, pumps, and the like.

Non-limiting examples of these towers, columns, splitters or trains used alone or in combination include one or more of a demethanizer, preferably a high temperature demethanizer, a deethanizer, a depropanizer, preferably a wet depropanizer, a wash tower often referred to as a caustic wash tower and/or quench tower, absorbers, adsorbers, membranes, ethylene (C2) splitter, propylene (C3) splitter, butene (C4) splitter, and the like.

Various recovery systems useful for recovering predominately olefin(s), preferably prime or light olefin(s) such as ethylene, propylene and/or butene are described in U.S. Pat. No. 5,960,643 (secondary rich ethylene stream), U.S. Pat. Nos. 5,019,143, 5,452,581 and 5,082,481 (membrane separations), U.S. Pat. No. 5,672,197 (pressure dependent adsorbents), U.S. Pat. No. 6,069,288 (hydrogen removal), U.S. Pat. No. 5,904,880 (recovered methanol to hydrogen and carbon dioxide in one step), U.S. Pat. No. 5,927,063 (recovered methanol to gas turbine power plant), and U.S. Pat. No. 6,121, 504 (direct product quench), U.S. Pat. No. 6,121,503 (high purity olefins without superfractionation), and U.S. Pat. No. 6,293,998 (pressure swing adsorption), which are all herein fully incorporated by reference.

Heat Recovery Processes

In one embodiment, the present invention is directed to a process for recovering heat from a high temperature effluent stream from catalyst regeneration or the like. The high temperature effluent stream preferably is taken from a catalyst regenerator associated with a fluidized catalytic cracker or an OTO reactor, e.g., an MTO reactor. The process includes the steps of: (a) passing the effluent stream through a heat exchanger associated with a steam generator fed with boiler feed water to produce high pressure steam and partially cool the effluent stream; (b) passing the partially cooled effluent stream through a heat exchanger associated with a high pressure boiler feed water preheater to provide preheated boiler feed water and further cool the effluent stream; and (c) passing the preheated boiler feed water to the steam generator.

The temperatures of the various streams in the inventive process may vary widely. Preferably, the high temperature effluent stream has a temperature of at least about 650° C. (at least about 1200° F.), the partially cooled effluent stream has a temperature not greater than about 262° C. (not greater than about 500° F.), and the further cooled effluent stream has a temperature not greater than about 127° C. (not greater than about 260° F.). In another embodiment, the high temperature effluent stream has a temperature ranging from about 650° to about 730° C. (from about 1200° to about 1350° F.), the partially cooled effluent stream has a temperature ranging from about 232° to about 343° C. (from about 450° to about 650° F.), and the further cooled effluent stream has a temperature ranging from about 116° to about 204° C. (from about 260° to about 400° F.). In another embodiment, the high temperature effluent stream has a temperature ranging from about 652° to about 691° C. (from about 1205° to about 1275° F.), the partially cooled effluent stream has a temperature ranging from about 260 to about 316° C. (from about 500° to about 600° F.), and the further cooled effluent stream has a temperature ranging from about 127° to about 160° C. (from about 260° to about 320° F.).

In one embodiment, the partially cooled effluent stream has been cooled to no less than about 249° C. (480° F.), and the further cooled effluent stream has been cooled to at least about 138° C. (280° F.). Optionally, the partially cooled effluent stream has been cooled to no less than about 277° C. (530° F.), and the further cooled effluent stream has been cooled to at least about 166° C. (330° F.). Ideally, the further cooled effluent stream has been cooled to at least 25° C. less than the partially cooled effluent stream temperature.

Likewise, the pressure and temperature of the preheated boiler feed water may vary widely. In one embodiment, for example, the preheated boiler feed water has a pressure of at least about 4240 kpaa (at least about 600 psig), and a temperature of at least about 150° C. (302° F.), optionally at least about 249° C. (480° F.). Optionally, the preheated boiler feed water has a pressure ranging from about 4240 to about 7688 kPaa (from about 600 to about 1100 psig), and a temperature ranging from about 150° to about 293° C. (from about 302° to about 560° F.). In another embodiment, the preheated boiler feed water has a pressure ranging from about 4240 to about 6309 kpaa (from about 600 to about 900 psig), and a temperature ranging from about 150° to about 277° C. (from about 302° to about 530° F.).

Preferably, the heat recovery process of the present invention includes a step of removing catalyst fines from one or more process streams. For example, in one embodiment, the high temperature effluent stream contains catalyst fines and is passed to a catalyst fines removal unit, optionally before step (a), for removal of the catalyst fines. In this embodiment, the high temperature effluent stream may have a temperature on the order of from about 1200° to about 1350° F. (about 649° C. to about 732° C.). Catalyst fines removal units that operate well under these temperature conditions include cyclone separators or other inertial separation devices, ceramic filters and/or metal filters.

Additionally or alternatively, the partially cooled effluent stream contains catalyst fines and is directed to a catalyst fines removal unit, optionally between steps (a) and (b), for removal of the catalyst fines. In this embodiment, the partially cooled effluent stream may have a temperature on the order of from about 480° to about 560° F. (about 249° C. to about 293° C.). Catalyst fines removal units that operate well under these temperature conditions include cyclone separators or other inertial separation devices, ceramic filters, metal filters and/or electrostatic precipitators.

Additionally or alternatively, the further cooled effluent stream contains catalyst fines and is passed to a catalyst fines removal unit, preferably after step (b), for removal of the catalyst fines. In this embodiment, the further cooled effluent stream may have a temperature below about 480° F. (about 249° C.). The catalyst fines removal unit preferably is selected from the group consisting of: an electrostatic precipitator, a wet electrostatic precipitator, a cyclone separator or other inertial separation device, a filter, a baghouse and a wet gas scrubber. All catalyst fines removal units benefit by operating at lower temperatures since the gas volume flow rate is reduced so the equipment size can be reduced. For example, the gas volumetric flow rate change of from 1200° F. (649° C.) to 500° F. (260° C.) is a factor reduction of 1.8 at constant pressure. Also, the equipment materials of construction cost is substantially reduced at 500° F. (260° C.) compared to 1200° F. (649° C.) due to reduction in wall thickness and metallurgy (e.g., going from alloy to non alloy steel).

Optionally, one or more process streams, preferably the further cooled effluent stream, is passed to a flue gas stack for disposal in ambient atmosphere. The further cooled effluent stream optionally is passed from the catalyst fines removal unit to the flue gas stack for disposal.

In one embodiment, the preheated boiler feed water and the high pressure steam from the steam generator are mixed in a steam drum and liquid boiler feed water is passed from the steam drum to the steam generator. High pressure steam optionally is taken from the steam drum, for example, for use in the reaction system.

Optionally, the steam generator and the preheater are located within a common enclosure. Alternatively, the steam generator and the preheater are located in separate enclosures.

In another embodiment, the invention is to an apparatus for recovering heat from a catalytic reactor system. The apparatus includes: (a) a catalyst regenerator having an outlet for hot flue gas; (b) a steam generator comprising a first indirect heat exchanger operatively connected to receive hot flue gas from the catalyst regenerator and a supply of high pressure liquid boiler feed water; (c) a boiler feed water preheater comprising a second indirect heat exchanger connected to receive the boiler feed water and operatively connected to receive partially cooled flue gas from the steam generator; (d) conduit means for passing preheated high pressure boiler feed water from the preheater to the steam generator; and (e) means for recovering high pressure steam from the steam generator.

In this embodiment, the apparatus optionally further comprises a steam drum operatively connected to receive the preheated boiler feed water and high pressure steam for mixing in the steam drum, and conduit means for passing liquid boiler feed water from the steam drum to the steam generator. Additionally, the apparatus optionally further includes a conduit means for passing high pressure steam from the steam drum. The steam generator and the preheater are located within a common enclosure or in separate enclosures.

In another embodiment, the invention is to a process for catalytic conversion using a molecular sieve catalyst which accumulates carbonaceous deposit during operation of a catalytic reactor, wherein the carbonaceous deposit is removed in a high temperature regenerator unit with a regeneration medium. This inventive process includes the steps of: (a) passing a high temperature effluent stream containing catalyst fines from the regenerator unit to a heat exchanger associated with a steam generator fed with boiler feed water to produce high pressure steam and a partially cooled effluent stream; (b) passing the partially cooled effluent stream to a heat exchanger associated with a high pressure boiler feed water preheater to further cool the effluent stream; and (c) further treating the effluent stream to remove the catalyst fines.

In another embodiment, the invention is to a process for catalytic conversion using a molecular sieve catalyst which accumulates carbonaceous deposit during operation of a catalytic reactor, wherein the carbonaceous deposit is removed in a high temperature regenerator unit with a regeneration medium. In this embodiment, the process includes the steps of: (a) passing a high temperature effluent stream from the regenerator unit to a heat exchanger associated with a steam generator fed with boiler feed water, to produce high pressure steam and a partially cooled effluent stream; (b) passing the partially cooled effluent stream to a heat exchanger associated with a high pressure boiler feed water preheater to provide preheated boiler feed water and further cooled effluent stream; (c) passing the preheated boiler feed water and the high pressure steam from the steam generator to a steam drum for direct contact and mixing; (d) recovering high pressure steam from the steam drum; and (e) passing liquid boiler feed water from the steam drum to the steam generator, thereby providing efficient recovery of thermal value.

In this embodiment, one or more process streams optionally contains catalyst fines and is passed to a catalyst fines removal unit for removal of the catalyst fines. For example, in one embodiment, the high temperature effluent stream contains catalyst fines and is passed to a catalyst fines removal unit for removal of the catalyst fines. Additionally or alternatively, the partially cooled effluent stream contains catalyst fines and is directed to a catalyst fines removal unit for removal of the catalyst fines. Additionally or alternatively, the further cooled effluent stream contains catalyst fines and is passed to a catalyst fines removal unit for removal of the catalyst fines. The catalyst fines optionally comprise particles whose largest particle dimension is less than about 100 microns, optionally less than about 60 microns. In one preferred embodiment, the catalyst comprises SAPO-34.

Figure 1:
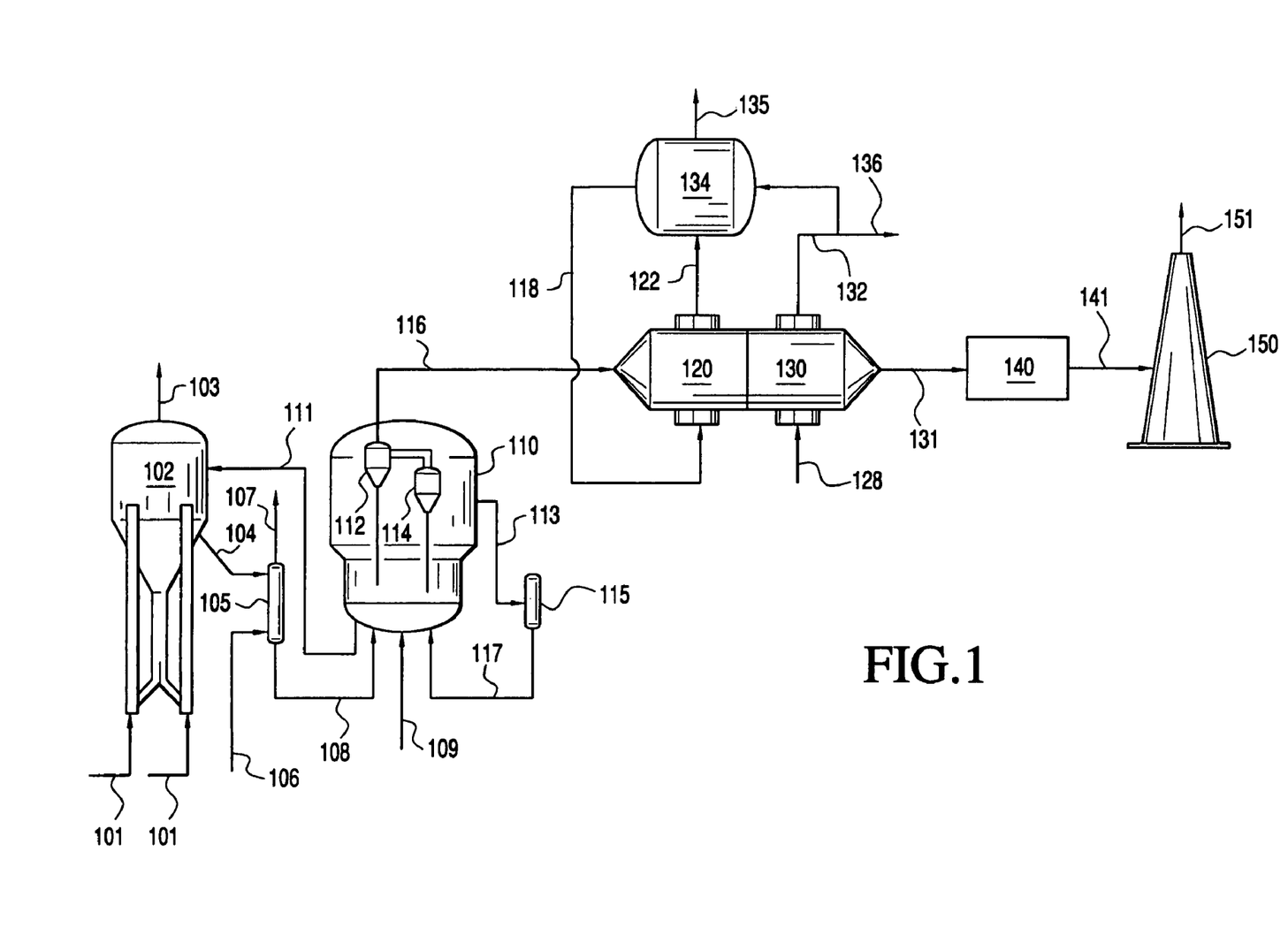
FIG. 1 is a schematic process flow diagram depicting an aspect of the invention.

Referring to FIG. 1, the process and apparatus of one embodiment of the present invention are depicted in a schematic process flow sheet. In the figure, an oxygenate such as methanol is directed through lines 101 to an OTO fluidized reactor 102 wherein the oxygenate is converted to light olefins and various byproducts which are yielded from the fluidized reactor 102 in a reactor effluent 103. The reactor effluent 103 optionally comprises methane, ethane, propane, various oxygenate byproducts, C4+ olefins, water, and hydrocarbon components in addition to the light olefins, ethylene and propylene. Ideally, the reactor effluent 103 is directed to a series of purification and separation units, not shown, wherein the light olefins are separated from the other components contained in reactor effluent 103.

FIG. 1 also illustrates a catalyst regeneration system, which is in fluid communication with the fluidized reactor 102. As shown, at least a portion of the catalyst compositions contained in fluidized reactor 102 are withdrawn and transported, preferably in a fluidized manner, in conduit 104 from the fluidized reactor 102 to a catalyst stripper 105. In the catalyst stripper 105, the catalyst compositions contact a stripping medium, e.g., steam and/or nitrogen, under conditions effective to remove interstitial hydrocarbons from the molecular sieve catalyst compositions. As shown, stripping medium is introduced into catalyst stripper 105 through line 106, and the resulting stripped stream 107 is released from catalyst stripper 105. Optionally, all or a portion of the stripped stream 107 is directed back to fluidized reactor 102.

During contacting of the oxygenate feedstock with the molecular sieve catalyst composition in the fluidized reactor 102, the molecular sieve catalyst composition may become at least partially deactivated. That is, the molecular sieve catalyst composition becomes at least partially coked. In order to reactivate the molecular sieve catalyst composition, the catalyst composition preferably is directed to a catalyst regenerator 110. As shown, the stripped catalyst composition is transported, preferably in a fluidized manner, from catalyst stripper 105 to catalyst regenerator 110 in conduit 108.

In catalyst regenerator 110, the stripped catalyst composition contacts a regeneration medium, preferably comprising oxygen, under conditions effective (preferably including heating the coked catalyst) to at least partially regenerate the catalyst composition contained therein. As shown, the regeneration medium is introduced into the catalyst regenerator 110 through line 109, and the resulting regenerated catalyst compositions are ultimately transported, preferably in a fluidized manner, from catalyst regenerator 110 back to the fluidized reactor 102 through conduit 111. In another embodiment, not shown, the regenerated catalyst composition additionally or alternatively is directed, optionally in a fluidized manner, from the catalyst regenerator 110 to one or more of the fluidized reactor 102 and/or the catalyst stripper 105. In one embodiment, not shown, a portion of the catalyst composition in the reaction system is transported directly, e.g., without first passing through the catalyst stripper 105, optionally in a fluidized manner, from the fluidized reactor 102 to the catalyst regenerator 110.

As the catalyst compositions contact the regeneration medium in catalyst regenerator 110, the temperature of the catalyst composition will increase due to the exothermic nature of the regeneration process. As a result, it may be desirable to control the temperature of the catalyst composition by directing at least a portion of the catalyst composition from the catalyst regenerator 110 to a catalyst cooler 115. As shown, the catalyst composition is transported, preferably in a fluidized manner, from catalyst regenerator 110 to the catalyst cooler 115 through conduit 113. The resulting cooled catalyst composition is transported, preferably in a fluidized manner, from catalyst cooler 115 back to the catalyst regenerator 110 through conduit 117. In another embodiment, not shown, the cooled catalyst composition additionally or alternatively is directed, optionally in a fluidized manner from the catalyst cooler 115 to one or more of the fluidized reactor 102 and/or the catalyst stripper 105.

Regenerator vessel 110, in which are optionally placed cyclones 112 and 114, is operatively connected via conduit 116 in a first cooling stage with steam generator 120. Conduit 116 contains regeneration flue gas (a high pressure effluent stream), which is indirectly contacted in a heat exchange relationship with preheated boiler feed water fed to the steam generator 120 via conduit 118 to form a partially cooled effluent stream.

The partially cooled effluent stream passes from the steam generator 120 to a second cooling stage comprising a boiler water preheater 130 (supplied by high pressure boiler feed water supply line 128), where the effluent gas is indirectly contacted in heat exchange relationship with low temperature (e.g., about 116° C. (about 240° F.)) boiler feed water supplied at high pressure (e.g., about 4240 kPaa (about 600 psig)) to recover additional thermal value from the gas prior to disposal and form a further cooled effluent stream 131. The preheated boiler feed water is then passed under pressure via conduit 132 to an intermediate holding vessel, high pressure steam drum 134, or to boiler feed water users in other refinery unit operations via line 136. Further cooled effluent stream 131 is optionally cleaned in a catalyst fines removal unit 140, which may be selected from the group consisting of an electrostatic precipitator, a wet electrostatic precipitator, a cyclone separator or other inertial separation device, a filter, a baghouse and a wet gas scrubber, to remove catalyst fines and form fines-depleted stream 141.

Some catalyst fines removal units do not operate well under high temperature conditions. Conventional baghouse materials, for example, are typically limited to about 400° F. (204° C.) to about 450° F. (232° C.). Accordingly, it is desired, at least for some catalyst fines removal units, that the stream directed to the catalyst fines removal unit be cooled to a temperature suitable for catalyst fines removal. It is generally undesirable, however, to cool the effluent stream to a temperature below its dew point (typically about 212° F. (100° C.) for OTO reaction processes) since condensate formation may plug up the filters or bags. Wet effluent stream precipitators typically operate better at low temperatures, say on the order of from about 200° F. (93° C.) to about 300° F. (149° C.).

As shown, fines-depleted stream 141 is directed to flue gas stack 150 for disposal. Optionally, fines-depleted stream 141 passes through a pressure reduction valve (not shown), e.g., a slide valve, prior to introduction into the stack 150. It has been found that higher pressures in the steam generator 120 are preferred. Thus, the pressure reduction valve preferably is situated as far downstream towards the stack 150 as possible.

Ultimately, the fines-depleted steam 141 is released from the flue gas stack 150 via exhaust stream 151.

Steam is taken off the steam generator 120 via line 122 where it is mixed with the preheated high pressure boiler feed water introduced via line 132. Liquid preheated boiler feed water is taken from the steam drum via line 118 for cycling to the steam generator, while high pressure steam can be taken from the steam drum via line 135.

In one embodiment, not shown, reactor effluent 103 is cooled in one or more heat exchangers, not shown. Saturated steam is typically formed by this cooling process. Similarly, the process of cooling the catalyst in catalyst cooler 115 also forms saturated steam. Optionally, two or more of the saturated steam streams from the reactor effluent cooling, the catalyst cooling, the regeneration flue gas cooling, and/or from a saturated steam production unit are combined into a combined saturated steam stream, not shown, which optionally is directed to: (a) a stand alone fired superheater; (b) a convection section of a fired boiler; and/or (c) a waste heat boiler on the exhaust of a gas turbine.

Figure 2:
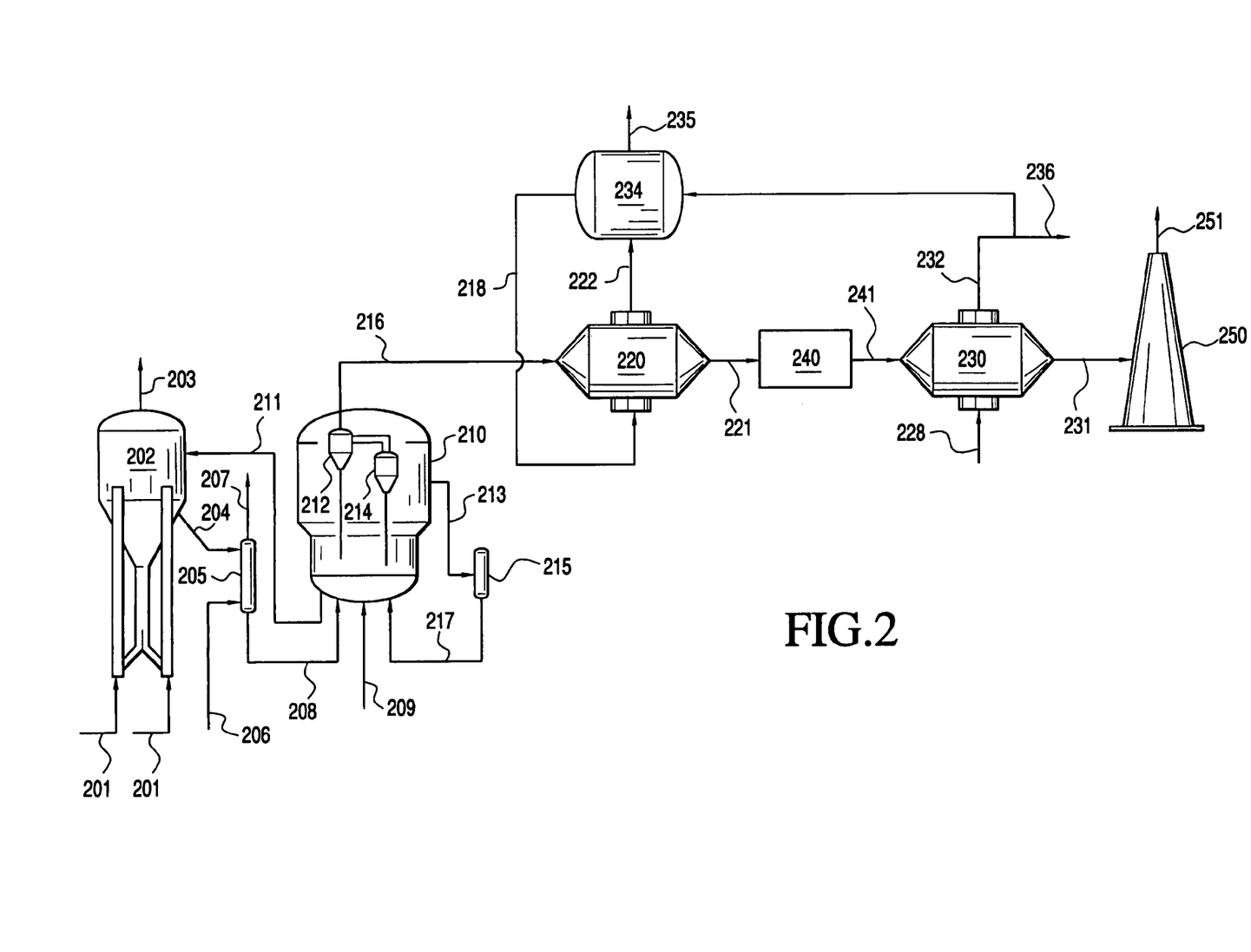
FIG. 2 is a schematic process flow diagram depicting another aspect of the invention.

FIG. 2 illustrates another embodiment of the present invention in a schematic process flow sheet. In this embodiment, the catalyst fines removal unit 240 is situated between the steam generator 220 and the boiler water preheater 230.

As shown, an oxygenate such as methanol is directed through lines 201 to an OTO fluidized reactor 202 wherein the oxygenate is converted to light olefins and various byproducts which are yielded from the fluidized reactor 202 in a reactor effluent 203. The reactor effluent 203 optionally comprises methane, ethane, propane, various oxygenate byproducts, C4+ olefins, water, and hydrocarbon components in addition to the light olefins, ethylene and propylene. Ideally, the reactor effluent 203 is directed to a series of purification and separation units, not shown, wherein the light olefins are separated from the other components contained reactor effluent 203.

FIG. 2 also illustrates a catalyst regeneration system, which is in fluid communication with the fluidized reactor 202. As shown, at least a portion of the catalyst compositions contained in fluidized reactor 202 are withdrawn and transported, preferably in a fluidized manner, in conduit 204 from the fluidized reactor 202 to a catalyst stripper 205. In the catalyst stripper 205, the catalyst compositions contact a stripping medium, e.g., steam and/or nitrogen, under conditions effective to remove interstitial hydrocarbons from the molecular sieve catalyst compositions. As shown, stripping medium is introduced into catalyst stripper 205 through line 206, and the resulting stripped stream 207 is released from catalyst stripper 205. Optionally, all or a portion of the stripped stream 207 is directed back to fluidized reactor 202.

During contacting of the oxygenate feedstock with the molecular sieve catalyst composition in the fluidized reactor 202, the molecular sieve catalyst composition may become at least partially deactivated. That is, the molecular sieve catalyst composition becomes at least partially coked. In order to reactivate the molecular sieve catalyst composition, the catalyst composition preferably is directed to a catalyst regenerator 210. As shown, the stripped catalyst composition is transported, preferably in a fluidized manner, from catalyst stripper 205 to catalyst regenerator 210 in conduit 208.

In catalyst regenerator 210, the stripped catalyst composition contacts a regeneration medium, preferably comprising oxygen, under conditions effective (preferably including heating the coked catalyst) to at least partially regenerate the catalyst composition contained therein. As shown, the regeneration medium is introduced into the catalyst regenerator 210 through line 209, and the resulting regenerated catalyst compositions are ultimately transported, preferably in a fluidized manner, from catalyst regenerator 210 back to the fluidized reactor 202 through conduit 211. In another embodiment, not shown, the regenerated catalyst composition additionally or alternatively is directed, optionally in a fluidized manner, from the catalyst regenerator 210 to one or more of the fluidized reactor 202 and/or the catalyst stripper 205. In one embodiment, not shown, a portion of the catalyst composition in the reaction system is transported directly, e.g., without first passing through the catalyst stripper 205, optionally in a fluidized manner, from the fluidized reactor 202 to the catalyst regenerator 210.

As the catalyst compositions contact the regeneration medium in catalyst regenerator 210, the temperature of the catalyst composition will increase due to the exothermic nature of the regeneration process. As a result, it may be desirable to control the temperature of the catalyst composition by directing at least a portion of the catalyst composition from the catalyst regenerator 210 to a catalyst cooler 215. As shown, the catalyst composition is transported, preferably in a fluidized manner, from catalyst regenerator 210 to the catalyst cooler 215 through conduit 213. The resulting cooled catalyst composition is transported, preferably in a fluidized manner, from catalyst cooler 215 back to the catalyst regenerator 210 through conduit 217. In another embodiment, not shown, the cooled catalyst composition additionally or alternatively is directed, optionally in a fluidized manner from the catalyst cooler 215 to one or more of the fluidized reactor 202 and/or the catalyst stripper 205.

Regenerator vessel 210, in which are optionally placed cyclones 212 and 214, is operatively connected via conduit 216 in a first cooling stage with steam generator 220. Conduit 216 contains regeneration flue gas (a high temperature effluent stream), which is indirectly contacted in a heat exchange relationship with preheated boiler feed water fed to the steam generator 220 via conduit 218 to form partially cooled effluent stream 221. Optionally, the flue gas is passed directly to the cooling system or it may be pretreated to remove catalyst fines in a known manner, such as disclosed by Haddad et al. in U.S. Pat. No. 4,504,291, the entirety of which is incorporated herein by reference.

Partially cooled effluent stream 221 passes from the steam generator 220 to a catalyst fines removal unit 240, which may be selected from the group consisting of an electrostatic precipitator, a cyclone separator or other inertial separation device, and a filter (e.g., a metal filter and/or a ceramic filter), to remove catalyst fines and form fines-depleted stream 241. Fines-depleted stream 241 is then directed to a second cooling stage comprising a boiler water preheater 230 (supplied by high pressure boiler feed water supply line 228), where the effluent gas is indirectly contacted in heat exchange relationship with low temperature (e.g., about 116° C. (about 240° F.)) boiler feed water supplied at high pressure (e.g., about 4240 kpaa (about 600 psig)) to recover additional thermal value from the gas prior to disposal and form further cooled effluent stream 231. The preheated boiler feed water is then passed under pressure via conduit 232 to an intermediate holding vessel, high pressure steam drum 234, or to boiler feed water users in other refinery unit operations via line 236.

As shown, further cooled effluent stream 231 is directed to flue gas stack 250 for disposal. Optionally, further cooled effluent stream 231 passes through a pressure reduction valve (not shown), e.g., a slide valve, prior to introduction into the stack 250. It has been found that higher pressures in the steam generator 220 are preferred. Thus, the pressure reduction valve preferably is situated as far downstream towards the stack 250 as possible. Ultimately, the further cooled effluent stream 231 is released from the flue gas stack 250 via exhaust stream 251.

Steam is taken off the steam generator 220 via line 222 where it is mixed with the preheated high pressure boiler feed water introduced via line 232. Liquid preheated boiler feed water is taken from the steam drum via line 218 for cycling to the steam generator, while high pressure steam can be taken from the steam drum via line 235.

Figure 3:
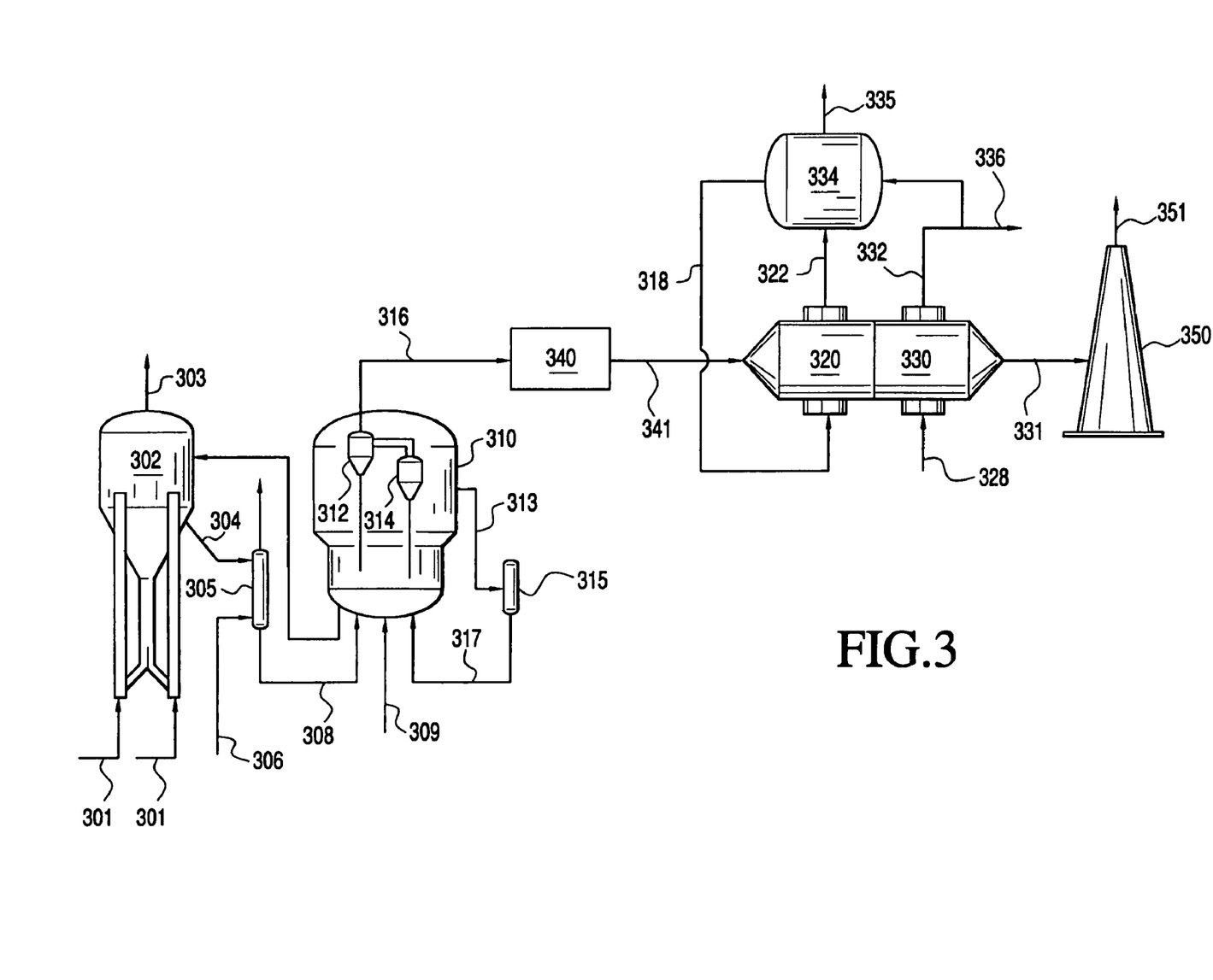
FIG. 3 is a schematic process flow diagram depicting another aspect of the invention.

FIG. 3 illustrates another embodiment of the present invention in a schematic process flow sheet. In this embodiment, the catalyst fines removal unit 340 is situated between the catalyst regenerator 310 and the steam generator 320.

As shown, an oxygenate such as methanol is directed through lines 301 to an OTO fluidized reactor 302 wherein the oxygenate is converted to light olefins and various byproducts which are yielded from the fluidized reactor 302 in a reactor effluent 303. The reactor effluent 303 optionally comprises methane, ethane, propane, various oxygenate byproducts, C4+ olefins, water, and hydrocarbon components in addition to the light olefins, ethylene and propylene. Ideally, the reactor effluent 303 is directed to a series of purification and separation units, not shown, wherein the light olefins are separated from the other components contained in reactor effluent 303.

FIG. 3 also illustrates a catalyst regeneration system, which is in fluid communication with the fluidized reactor 302. As shown, at least a portion of the catalyst compositions contained in fluidized reactor 302 are withdrawn and transported, preferably in a fluidized manner, in conduit 304 from the fluidized reactor 302 to a catalyst stripper 305. In the catalyst stripper 305, the catalyst compositions contact a stripping medium, e.g., steam and/or nitrogen, under conditions effective to remove interstitial hydrocarbons from the molecular sieve catalyst compositions. As shown, stripping medium is introduced into catalyst stripper 305 through line 306, and the resulting stripped stream 307 is released from catalyst stripper 305. Optionally, all or a portion of the stripped stream 307 is directed back to fluidized reactor 302.

During contacting of the oxygenate feedstock with the molecular sieve catalyst composition in the fluidized reactor 302, the molecular sieve catalyst composition may become at least partially deactivated. That is, the molecular sieve catalyst composition becomes at least partially coked. In order to reactivate the molecular sieve catalyst composition, the catalyst composition preferably is directed to a catalyst regenerator 310. As shown, the stripped catalyst composition is transported, preferably in a fluidized manner, from catalyst stripper 305 to catalyst regenerator 310 in conduit 308.

In catalyst regenerator 310, the stripped catalyst composition contacts a regeneration medium, preferably comprising oxygen, under conditions effective (preferably including heating the coked catalyst) to at least partially regenerate the catalyst composition contained therein. As shown, the regeneration medium is introduced into the catalyst regenerator 310 through line 309, and the resulting regenerated catalyst compositions are ultimately transported, preferably in a fluidized manner, from catalyst regenerator 310 back to the fluidized reactor 302 through conduit 311. In another embodiment, not shown, the regenerated catalyst composition additionally or alternatively is directed, optionally in a fluidized manner, from the catalyst regenerator 310 to one or more of the fluidized reactor 302 and/or the catalyst stripper 305. In one embodiment, not shown, a portion of the catalyst composition in the reaction system is transported directly, e.g., without first passing through the catalyst stripper 305, optionally in a fluidized manner, from the fluidized reactor 302 to the catalyst regenerator 310.

As the catalyst compositions contact the regeneration medium in catalyst regenerator 310, the temperature of the catalyst composition will increase due to the exothermic nature of the regeneration process. As a result, it may be desirable to control the temperature of the catalyst composition by directing at least a portion of the catalyst composition from the catalyst regenerator 310 to a catalyst cooler 315. As shown, the catalyst composition is transported, preferably in a fluidized manner, from catalyst regenerator 310 to the catalyst cooler 315 through conduit 313. The resulting cooled catalyst composition is transported, preferably in a fluidized manner, from catalyst cooler 315 back to the catalyst regenerator 310 through conduit 317. In another embodiment, not shown, the cooled catalyst composition additionally or alternatively is directed, optionally in a fluidized manner from the catalyst cooler 315 to one or more of the fluidized reactor 302 and/or the catalyst stripper 305.

Regenerator vessel 310, in which are optionally placed cyclones 312 and 314, is operatively connected via conduit 316 with a catalyst fines removal unit 340, which may be selected from the group consisting of a cyclone separator or other inertial separation device, a metal filter and a ceramic filter to remove catalyst fines from the regeneration flue gas and form fines-depleted stream 341. Fines-depleted stream 341 is then directed to a first cooling stage with steam generator 320. The fines-depleted stream 341 is indirectly contacted in a heat exchange relationship with preheated boiler feed water fed to the steam generator 320 via conduit 318.

Partially cooled effluent gas passes from the steam generator 320 to a second cooling'stage comprising a boiler water preheater 330 (supplied by high pressure boiler feed water supply line 328), where the effluent gas is indirectly contacted in heat exchange relationship with low temperature (e.g., about 116° C. (about 240° F.)) boiler feed water supplied at high pressure (e.g., about 4240 kpaa (about 600 psig)) to recover additional thermal value from the gas prior to disposal and form further cooled effluent stream 331. The preheated boiler feed water is then passed under pressure via conduit 332 to an intermediate holding vessel, high pressure steam drum 334, or to boiler feed water users in other refinery unit operations via line 336.

Further cooled effluent stream 331 is optionally directed to flue gas stack 350 for disposal. Optionally, further cooled effluent stream 331 passes through a pressure reduction valve (not shown), e.g., a slide valve, prior to introduction into the stack 350. It has been found that higher pressures in the steam generator 320 are preferred. Thus, the pressure reduction valve preferably is situated as far downstream towards the stack 350 as possible. Ultimately, further cooled effluent stream 331 is released from the flue gas stack 350 via exhaust stream 351.

Steam is taken off the steam generator 320 via line 322 where it is mixed with the preheated high pressure boiler feed water introduced via line 332. Liquid preheated boiler feed water is taken from the steam drum via line 318 for cycling to the steam generator, while high pressure steam can be taken from the steam drum via line 335.

As discussed above in reference to FIGS. 1-3, the process and systems of the present invention preferably comprise at least one catalyst fines removal unit. In FIG. 1, the catalyst fines removal unit 140 was situated downstream of the boiler water preheater 130. In FIG. 2, the catalyst fines removal unit 240 is situated between steam generator 220 and boiler water preheater 230. In FIG. 3, the catalyst fines removal unit 340 receives the flue gas directly from catalyst regenerator 310 via conduit 316. In this embodiment, the catalyst fines removal unit 340 is situated upstream of the steam generator 120. In other embodiments, not shown, the process and system of the present invention includes a plurality of catalyst fines removal units. For example, the process and system of the present invention optionally combines two or more of the embodiments disclosed in FIGS. 1-3.

For example, the process and system of the present invention optionally includes two catalyst fines removal units, one situated downstream of the boiler water preheater and another situated between the steam generator and the boiler water preheater. In another embodiment, the process and system comprises two catalyst fines removal units, one of which is situated downstream of the boiler water preheater and the other of which is situated upstream of the steam generator. In another embodiment, the process and system of the present invention comprises two catalyst fines removal units, one of which is situated between the steam generator and the boiler water preheater, and the other of which is situated upstream of the steam generator. In another embodiment of the present invention, the process and system of the present invention includes three or more catalyst fines removal units. In this embodiment, for example, the process and system comprises a catalyst fines removal unit situated upstream of the steam generator, a second catalyst fines removal unit situated between the steam generator and the boiler water preheater and a third catalyst fines removal unit situated downstream of the boiler water preheater. Thus, should it be desired to form a relatively fines-free stream from the effluent stream processed by the process and system of the present invention, one skilled in the art would be able to combine two or more of the embodiments disclosed in the present specification to achieve this objective.

Figure 4:
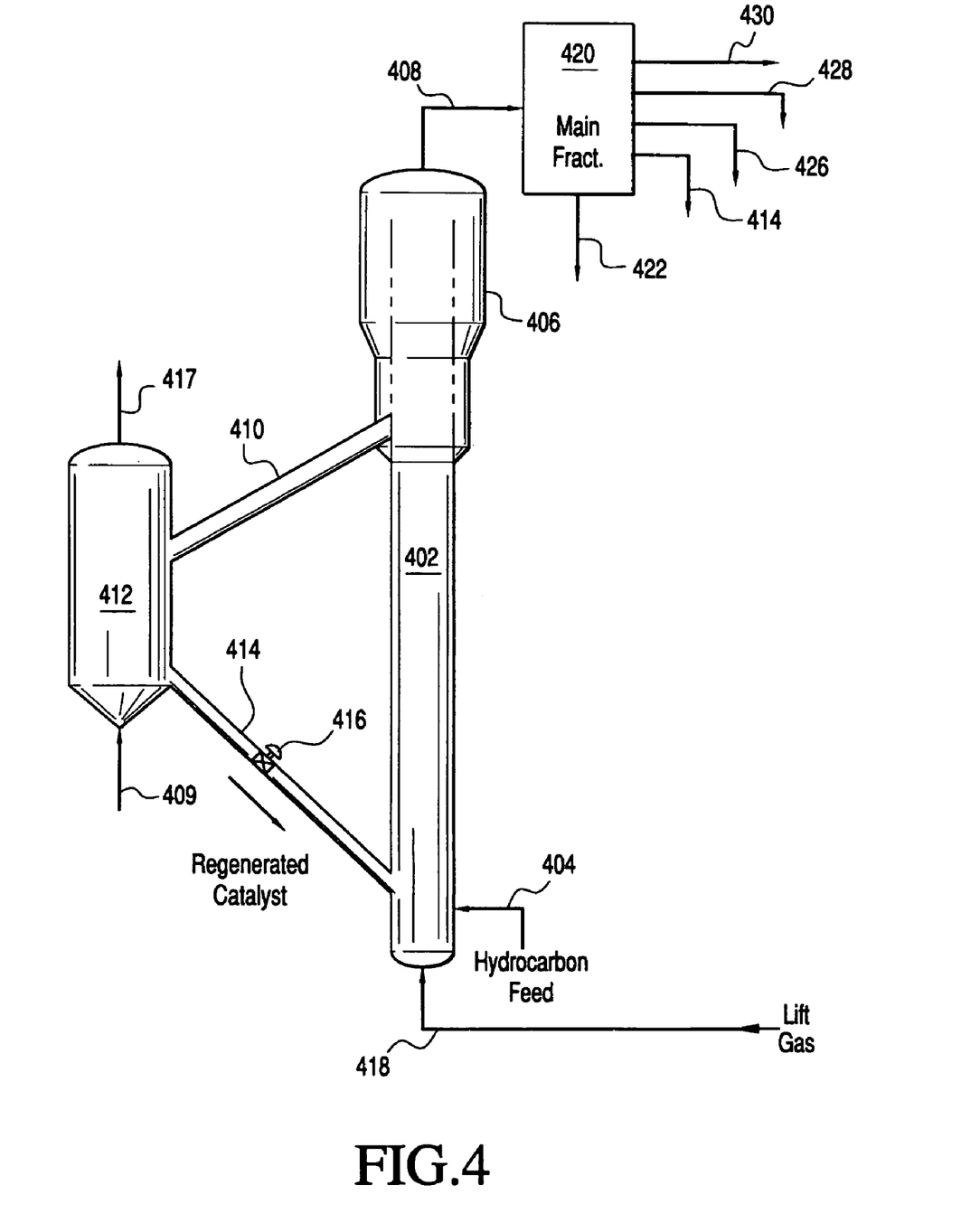
FIG. 4 shows a typical FCC fluidized bed reactor system showing a catalyst regenerator, such as used to produce a high temperature effluent stream for use in the inventive process.

In another embodiment of the present invention, the process and system of the present invention is integrated into an FCC unit. An exemplary non-limiting FCC unit is represented schematically in FIG. 4. As shown, a hydrocarbon feed is introduced near the bottom of the riser reactor 402 via inlet means 404. Hot regenerated catalyst is also introduced to the bottom of the riser by a standpipe supply conduit 414, usually equipped with a flow control valve 416. A lift gas is introduced near the liquid and solid feed inlets via conduit 418. The liquid feed volatilizes and forms a suspension with the solid catalyst, which proceeds upwardly in the vertical riser reactor. Such equipment is conventionally used in catalytic cracking operations of this kind and its construction and operation will be apparent to those skilled in the art. The vapor reactor effluent separated in the cyclone and in the stripping means, including diluent vapor, is withdrawn from the reactor by a conduit 408.

Stripped catalyst containing carbonaceous deposits or coke is withdrawn from the bottom of the stripping section through a conduit 410 and conducted to a regeneration zone in vessel 412. In the regeneration zone the catalyst is regenerated by passing an oxygen-containing gas, such as air, through a conduit 409, burning the coke off the catalyst in the regeneration zone and withdrawing the flue gas by a conduit 417. This high temperature flue gas, e.g., from about 649° C. to about 760° C.+ (from about 1200° F. to about 1400° F.+), is then passed to a heat recovery train according to the present invention as shown, for example, in FIGS. 1-3.

Cracked hydrocarbon product from the FCC unit passes from outlet 408 to a main fractionator unit 420, where the FCC effluent is separated into a heavy bottoms stream 422, heavy distillate 414, light distillate 426, naphtha 428, and a light overhead stream 430, rich in $C_2$-$C_4$ olefins, $C_1$-$C_4$ saturates, and other light cracked gas components. Flue gas exiting the catalyst regenerator via conduit 417 is passed to a heat recovery system, as depicted in one or more of FIGS. 1-3. Conventional large pore zeolite solid FCC catalyst may be used in the reactor utilizing the process. Particularly useful molecular sieves are finely divided acidic zeolites, preferably low coke-producing crystalline zeolite cracking catalysts comprising faujasite, crystalline REY zeolites and other large pore zeolites known in the art. Typically, the catalyst is in the form of catalyst fines having an average size (in terms of its largest dimension) ranging from about 20 to about 100 microns.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A process for recovering heat from a high temperature effluent stream from a catalyst regenerator, wherein the process comprises the steps of:
   (a) passing the effluent stream from a catalyst regenerator through a heat exchanger associated with a steam generator fed with liquid preheated boiler feed water to produce high pressure steam and partially cool the effluent stream;
   (b) passing the partially cooled effluent stream through a heat exchanger associated with a high pressure boiler feed water preheater to provide preheated boiler feed water and further cool the effluent stream; and
   (c) passing the preheated boiler feed water to the steam generator,
      wherein the preheated boiler feed water and the high pressure steam from the steam generator are mixed in a steam drum and liquid preheated boiler feed water is passed from the steam drum to the steam generator,
      wherein the high temperature effluent stream has a temperature of at least about 650° C., the partially cooled effluent stream has a temperature not greater than about 262° C., and the further cooled effluent stream has a temperature not greater than about 127° C., and
      wherein high pressure steam is taken from the steam drum.

2. The process of claim 1, wherein the high temperature effluent stream has a temperature ranging from about 650° to about 730° C., the partially cooled effluent stream has a temperature ranging from about 232° to about 343° C., and the further cooled effluent stream has a temperature ranging from about 116° to about 204° C.

3. The process of claim 1, wherein the high temperature effluent stream has a temperature ranging from about 652° to about 691° C., the partially cooled effluent stream has a temperature ranging from about 260° to about 316° C., and the further cooled effluent stream has a temperature ranging from about 127° to about 160° C.

4. The process of claim 1, wherein the preheated boiler feed water has a pressure of at least about 4240 kPaa, and a temperature of at least about 150° C.

5. The process of claim 1, wherein the preheated boiler feed water has a pressure ranging from about 4240° to about 7688 kPaa, and a temperature ranging from about 150° to about 293° C.

6. The process of claim 1, wherein the preheated boiler feed water has a pressure ranging from about 4240° to about 6309 kPaa, and a temperature ranging from about 150° to about 277° C.

7. The process of claim 1, wherein the further cooled effluent stream contains catalyst fines and is directed to a catalyst fines removal unit for removal of the catalyst fines.

8. The process of claim 7, wherein the catalyst fines removal unit is selected from the group consisting of: an electrostatic precipitator, a wet electrostatic precipitator, a cyclone separator or other inertial separation device, a filter, a baghouse and a wet gas scrubber.

9. The process of claim 8, wherein the effluent stream is passed from the catalyst fines removal unit to a flue gas stack for disposal in ambient atmosphere.

10. The process of claim 1, wherein the high temperature effluent stream contains catalyst fines and is directed to a catalyst fines removal unit before step (a) for removal of the catalyst fines.

11. The process of claim 10, wherein the catalyst fines removal unit is selected from the group consisting of: a cyclone separator or other inertial separation device, a metal filter and a ceramic filter.

12. The process of claim 1, wherein the partially cooled effluent stream contains catalyst fines and is directed to a catalyst fines removal unit for removal of the catalyst fines.

13. The process of claim 12, wherein the catalyst fines removal unit is selected from the group consisting of: an electrostatic precipitator, a cyclone separator or other inertial separation device, and a filter.

14. The process of claim 1, wherein the high temperature effluent stream is taken from a catalyst regenerator of a fluidized catalytic cracker.

15. The process of claim 1, wherein the high temperature effluent stream is taken from a catalyst regenerator associated with an oxygenate to olefins reactor.

16. The process of claim 1, wherein the high temperature effluent stream is taken from a catalyst regenerator associated with a methanol to olefins reactor.

17. The process of claim 1, wherein the steam generator and the preheater are located within a common enclosure.

18. A process for catalytic conversion using a molecular sieve catalyst which accumulates carbonaceous deposit during operation of a catalytic reactor, wherein the carbonaceous deposit is removed in a high temperature regenerator unit with a regeneration medium, the process comprising the steps of:
   (a) passing a high temperature effluent stream from the regenerator unit to a heat exchanger associated with a steam generator fed with preheated boiler feed water, to produce high pressure steam and a partially cooled effluent stream;
   (b) passing the partially cooled effluent stream to a heat exchanger associated with a high pressure boiler feed water preheater to provide preheated boiler feed water and further cooled effluent stream;
   (c) passing the preheated boiler feed water and the high pressure steam from the steam generator to a steam drum for direct contact and mixing;
   (d) recovering high pressure steam from the steam drum; and
   (e) passing liquid preheated boiler feed water from the steam drum to the steam generator, thereby providing efficient recovery of thermal values,
   wherein the high temperature effluent stream has a temperature of at least about 650° C., the partially cooled effluent stream has a temperature not greater than about 262° C., and the further cooled effluent stream has a temperature not greater than about 127° C.

19. The process of claim 18, wherein the further cooled effluent stream contains catalyst fines and is passed to a catalyst fines removal unit for removal of the catalyst fines.

20. The process of claim 19, wherein the catalyst fines removal unit is selected from the group consisting of: an electrostatic precipitator, a wet electrostatic precipitator, a cyclone separator or other inertial separation device, a filter, a baghouse and a wet gas scrubber.

21. The process of claim 19, wherein the catalyst fines comprise particles whose largest particle dimension is less than about 100 microns.

22. The process of claim 19, wherein the catalyst fines comprise particles whose largest particle dimension is less than about 60 microns.

23. The process of claim 19, wherein the effluent stream is passed from the catalyst fines removal unit to a flue gas stack for disposal in ambient atmosphere.

24. The process of claim 18, wherein the high temperature effluent stream has a temperature ranging from about 650° to about 730° C., the partially cooled effluent stream has a temperature ranging from about 232° to about 343° C., and the further cooled effluent stream has a temperature ranging from about 116° to about 24° C.

25. The process of claim 18, wherein the high temperature effluent stream has a temperature ranging from about 652° to about 691° C., the partially cooled effluent stream has a temperature ranging from about 260 to about 316° C., and the further cooled effluent stream has a temperature ranging from about 127° to about 160° C.

26. The process of claim 18, wherein the preheated boiler feed water has a pressure of at least about 4240 kPaa, and a temperature of at least about 150° C.

27. The process of claim 18, wherein the preheated boiler feed water has a pressure ranging from about 4240 to about 7688 kPaa, and a temperature ranging from about 150° C. to about 293° C.

28. The process of claim 18 wherein the preheated boiler feed water has a pressure ranging from about 4240 to about 6309 kPaa, and a temperature ranging from about 150° to about 277° C.

29. The process of claim 18, wherein the high temperature effluent stream is taken from a catalyst regenerator of a fluidized catalytic cracker.

30. The process of claim 18, wherein the high temperature effluent stream is taken from a catalyst regenerator associated with an oxygenate to olefins reactor.

31. The process of claim 18, wherein the high temperature effluent stream is taken from a catalyst regenerator associated with a methanol to olefins reactor.

32. The process of claim 31, wherein the catalyst comprises SAPO-34.

33. The process of claim 18, wherein the steam generator and the preheater are located within a common enclosure.

34. The process of claim 18, wherein the partially cooled effluent stream has been cooled to no less than about 249° C., and the further cooled effluent stream has been cooled to at least 25° C. less than the partially cooled effluent stream temperature.

35. The process of claim 18, wherein the partially cooled effluent stream has been cooled to no less than about 277° C., and the further cooled effluent stream has been cooled to at least 25° C. less than the partially cooled effluent stream temperature.

* * * * *